United States Patent [19]

Davis

[11] Patent Number: 4,995,191

[45] Date of Patent: Feb. 26, 1991

[54] COMBINED ROOT BARRIER AND WATERING COLLAR ARRANGEMENT

[76] Inventor: James N. Davis, 3551 Scotland Dr. N., Highlands, Calif. 95660

[21] Appl. No.: 256,050

[22] Filed: Oct. 11, 1988

[51] Int. Cl.$^5$ .............................................. A01G 17/00
[52] U.S. Cl. ............................................ 47/25; 47/32
[58] Field of Search ................ 47/23, 25, 32, 73, 76, 47/79, 40.5, 42, 43, 48.5, 33; 405/277

[56] References Cited

U.S. PATENT DOCUMENTS

| | | | |
|---|---|---|---|
| 1,030,761 | 6/1912 | Archer | 405/277 |
| 2,859,558 | 11/1958 | Hallum | 47/33 X |
| 3,184,890 | 5/1965 | McKey | 47/73 |
| 3,195,272 | 7/1965 | Mosher et al. | 47/73 |
| 3,415,013 | 12/1968 | Galbraith | 47/33 X |
| 3,951,294 | 4/1976 | Witson | 47/33 X |
| 4,008,544 | 2/1977 | Ruppreht et al. | 47/77 |
| 4,019,279 | 4/1977 | Moorman et al. | 47/25 |
| 4,325,202 | 4/1982 | Liard | 47/73 |
| 4,665,645 | 5/1987 | Schau et al. | 47/25 |

FOREIGN PATENT DOCUMENTS

908279  2/1982  U.S.S.R. ................................. 47/73

Primary Examiner—Danton D. DeMille
Attorney, Agent, or Firm—Ladas & Parry

[57] ABSTRACT

A combined root deflector and watering collar which may be assembled from a plurality of panels. Each panel has a preselected shape and is formed of a comparatively thin body member having an upper arcuate edge, a lower arcuate edge and a pair of spaced apart lateral edges extending between the upper and lower arcuate edges. The upper and lower arcuate edges are concentric about a center remotely spaced from the upper and lower arcuate edges. The body has an outer surface of an inner surface and radially extending ribs project from the inner surface between the upper arcuate edge and regions adjacent the lower arcuate edge. A notch in the body at the lower arcuate edge adjacent each of the ribs and a thin section of the body extending along the rib from the notch are provided to achieve a weakening of the body so that as roots of the plant growing through the notch enlarge, the body will tear adjacent to the ribs and starting at the notch. Edge ribs are provided on each lateral edge defining a "T"-shape with the body and extending both from the inner surface and outer surface. A connector having walls defining a cavity for engaging edge ribs is provided so that lateral edges of adjacent panels may be joined together and a plurality of the panels may be thus joined together to define a substantially frusto-conical root deflector and watering collar. The dimensions of the panels are controlled so that the same panel may be used in combinations of, for example three, four and five to define different sized frusto-conical root deflectors and watering collars.

22 Claims, 4 Drawing Sheets

COMBINED ROOT BARRIER AND WATERING COLLAR ARRANGEMENT

BACKGROUND OF THE INVENTION

1. Field of the Invention

This invention relates to the planting art or, more particularly, to an improved planting arrangement in which a panel according to the principles of the present invention may be utilized connected together with various numbers of similar panels to define various sizes frusto-conical combined root deflectors and watering collars.

2. Description Of The Prior Art

When trees, shrubberies or the like are planted adjacent to curbs, sidewalks, roadways, gutters, foundations or other similar structures, it has been found that very often the roots from such trees or shrubs, with time, grow sufficiently so that the adjacent structures may be uplifted, cracked or otherwise disturbed from their desired position. Even where there are no such pavements, sidewalks, roadways or the like adjacent to the trees or shrubs, it has been found that roots tends to grow in diameter, and when a root has grown close to the surface, the root has also grown larger in diameter. Therefore, it tends to project above the surface of the ground. Since there is, additionally, often erosion of the soil around such trees or shrubs, the projection of the roots is exacerbated by the loss of such soil and unsightly root projections are visible.

It is known that roots from growing trees, shrubs or the like grow, generally, outwardly and downwardly. Roots do not grow upwardly. However, if the outwardly direction of the roots is at a comparatively shallow angle and the roots are growing close to the surface, there will be the above described problems with adjacent pavements, sidewalks, roadways, curbs or the like as well as the unsightly root projections in the surrounding ground surface even when no such structures are adjacent.

In order to prevent such effects from the roots, there have heretofore been known various types of root barriers, root deflectors and the like. The purpose of such root barriers, root deflectors or the like that have heretofore been utilized have been to deflect the growing roots from such a tree or shrub downwardly a predetermined distance before such roots can progress a significant distance outwardly. It has been found that an approximately 18" depth from the ground surface is satisfactory for depth of such root deflection.

Many devices have heretofore been utilized in an attempt to provide a root deflector. It is well known that corrugated metal strips have long been used to be as such root deflectors when placed around growing trees or shrubs and the corrugations provide vertically oriented ribs or channels which direct the roots downwardly to a level beneath the lower edge of the corrugated metal.

U.S. Pat. No. 4,019,279 illustrates a generally box-like structure utilized to help direct roots downwardly before such roots grow outwardly but such structures as illustrated therein require differential sizes for different size planting units.

Many other type of interconnected root barriers or other type structures have heretofore been proposed for utilization to solve the above problems. The following United I States Patents illustrate the wide variety of such devices or other structures that have been proposed.

| U.S. Patents | | |
| --- | --- | --- |
| No. Des. 33,332 | P. J. Wilson | October 9, 1900 |
| No. 78,233 | P. Poullain | May 26, 1868 |
| No. 100,300 | M. Ludlum | March 1, 1870 |
| No. 109,098 | A. S. Adams | Nov. 8, 1870 |
| No. 117,378 | J. W. Brook | July 25, 1871 |
| No. 173,446 | C. D. Cottman | Feb. 15, 1876 |
| No. 243,307 | F. Saniter | June 21, 1881 |
| No. 405,552 | F. Harlan | June 18, 1889 |
| No. 586,485 | J. F. Guyn | July 13, 1897 |
| No. 965,601 | A. Rockwood | July 26, 1910 |
| No. 1,500,917 | R. J. Bell | March 2, 1923 |
| No. 1,530,109 | P. M. Cummings | March 17, 1925 |
| No. 1,636,625 | J. W. Conrad | July 19, 1927 |
| No. 1,931,602 | S. T. Colman | Oct. 24, 1933 |
| No. 1,977,021 | W. Spencer | Oct. 16, 1934 |
| No. 2,017,308 | L. H. Elmer | Oct. 20, 1934 |
| No. 2,094,519 | C. W. Ballard | Sept. 28, 1937 |
| No. 2,436,770 | I. Hill et al | Feb. 24, 1948 |
| No. 2,769,277 | W. B. Keelor | Nov. 6, 1956 |
| No. 2,859,558 | A. Hallum | Nov. 11, 1958 |
| No. 3,053,010 | J. C. DeShazor | Sept. 11, 1962 |
| No. 3,415,013 | D. D. Galbraith | Dec. 10, 1968 |
| No. 3,485,449 | J. L. Wilson | Dec. 23, 1969 |
| No. 3,889,416 | Bergeron et al | June 17, 1975 |
| No. 3,951,294 | C. A. Wilson | April 20, 1976 |
| No. 4,642,938 | R. P. Georges | Feb. 17, 1987 |
| No. 4,665,645 | Schau, III et al | May 19, 1987 |

None of the above identified patents, however, have shown or suggested the solution to the problem of providing an effective root barrier structure which may be conveniently adapted to the "standard" sizes utilized in the tree and shrub planting industry such as 5-gallon, 15-gallon or 24 inch "box" a 32" balled in burlap trees, be long lasting and provide not only a watering collar but also act as a watering collar and prevent root girdling and prevention of root bound trees.

Further, in order to minimize cost and storage volume requirements, it is preferred that there be provided a structure that is adaptable to, at least, the above mentioned "standard" planting sizes of 5-gallon, 15-gallon and 24" box. Such structure should also, preferably, be comparatively low in cost, easy to install and assemble, and have an operational life long enough to ensure the proper deflection of the roots. Such structure should also, if possible, provide a watering collar so that water may be directed more precisely onto the root area.

Accordingly, there has long been a need for a combined root deflector and watering collar which will not only prevent damage from growing roots from a tree or shrub but also will minimize watering costs by providing a collar into which water for watering the tree or shrub may be directed to minimize waste water.

SUMMARY OF THE INVENTION

Accordingly, it is an object of the present invention to provide an improved root deflector for trees or shrubs.

It is another object of the present invention to provide an improved root deflector that also serves as a watering collar.

It is another object of the present invention to provide an improved root deflector and watering collar that may be quickly and easily assembled into the conventional sizes such a 5-gallon, 15-gallon or 24 inch "box" or 32" balled that are commonly used by nursery men or others associated with the industry of planting trees and shrubs.

Another object of the present invention is to provide a frusto-conical shaped combined root deflector and watering collar to prevent a root bound condition which has often occurred when a cylindrically shaped root protection device has been utilized.

The above and other objects of the present invention are achieved, in a preferred embodiment, by providing a flat, sheet-like panel which may be interconnected with a plurality of similar panels to define different sized generally frusto-conical combined root deflectors and watering collars. For example, the panel may be sized in accordance with the principles of the present invention so that 3 panels interconnected can provide the size associated with a standard 5-gallon planter, four panels interconnected together can provide the size associated with a 15-gallon planter and 5 panels connected together can provide the size associated with a conventional 24 inch "box" or 32" balled in burlap tree.

Each panel is generally comprised of a thin, flexible somewhat resilient body means which has an upper arcuate edge generally a segment of a circle about a remotely located center. The body means also has a lower arcuate edge spaced from the upper arcuate edge and preferably also concentric therewith about the same center as the upper arcuate edge.

The body means also has first and second lateral edges in spaced apart relation, an inner surface and an outer surface. Interior rib means are on the inner surface of the body means and present a preselected distance therefrom and extend from regions adjacent the upper arcuate edge to regions adjacent the lower arcuate edge. An edge rib means is on the lateral edges of the body means and projects from both the outer surface and the inner surface thereof extends from the upper arcuate edge to the lower arcuate edge.

Body means weakening means are adjacent to each of the interior rib means at the lower arcuate edge.

The panels as above described may be assembled together by a connector means which engages the edge rib means of adjacent panels and is retained thereon and restrained from both upward and downward movement by stop means on the panels. The body means and the connector means may be fabricated from the polypropolene copolymer and the body means may have a thickness of approximately 0.060 inches. In this preferred embodiment of the present invention the length of circular segment of the upper arcuate edge is on the order of 18 inches and the length of the lower arcuate edge is on the order of 23 inches. The radius of curvature of the upper arcuate edge may be on the order of 70 inches and the radius of curvature of the lower arcuate edge about the same center may be on the order of 88 inches. The lower arcuate edge may be spaced, therefore, about 18 inches from the upper arcuate edge.

The interior ribs project inwardly from the inner surface of the body means and the body means weakening means may be in the form of notches in the body means adjacent to the interior rib mains at the lower arcuate edge so that roots growing outwardly from a tree shrub planted adjacent to such a panel will be deflected downwardly by the rib means and then extend through the notch. As the root grows in diameter, the notch causes a tear to start in the panel adjacent to the interior rib means. Walls defining a depression extending from the end of the notch upwardly towards the upper arcuate edge of the panel means may also be provided so as to insure the weakening of the panels at this particular location and thus insure that tearing of the panel adjacent to the rib means.

Panels having the above dimensions may, in accordance with the principles of the present invention and as described below in greater detail, be assembled in units of 3 to provide the equivalent of a conventional 5-gallon planter, in units of 4 to provide the equivalent of a conventional 15-gallon planter or 24" balled in burlap tree and in units of 5 to provide the equivalent of a conventional 24 inch "box" balled in burlap tree.

BRIEF DESCRIPTION OF THE DRAWINGS

The above and other embodiments of the present invention may be more fully understood from the following detailed description taken together with the accompanying drawings wherein similar reference characters refer to similar elements throughout and in which.

DESCRIPTION OF THE PREFERRED EMBODIMENTS

Figure 1:
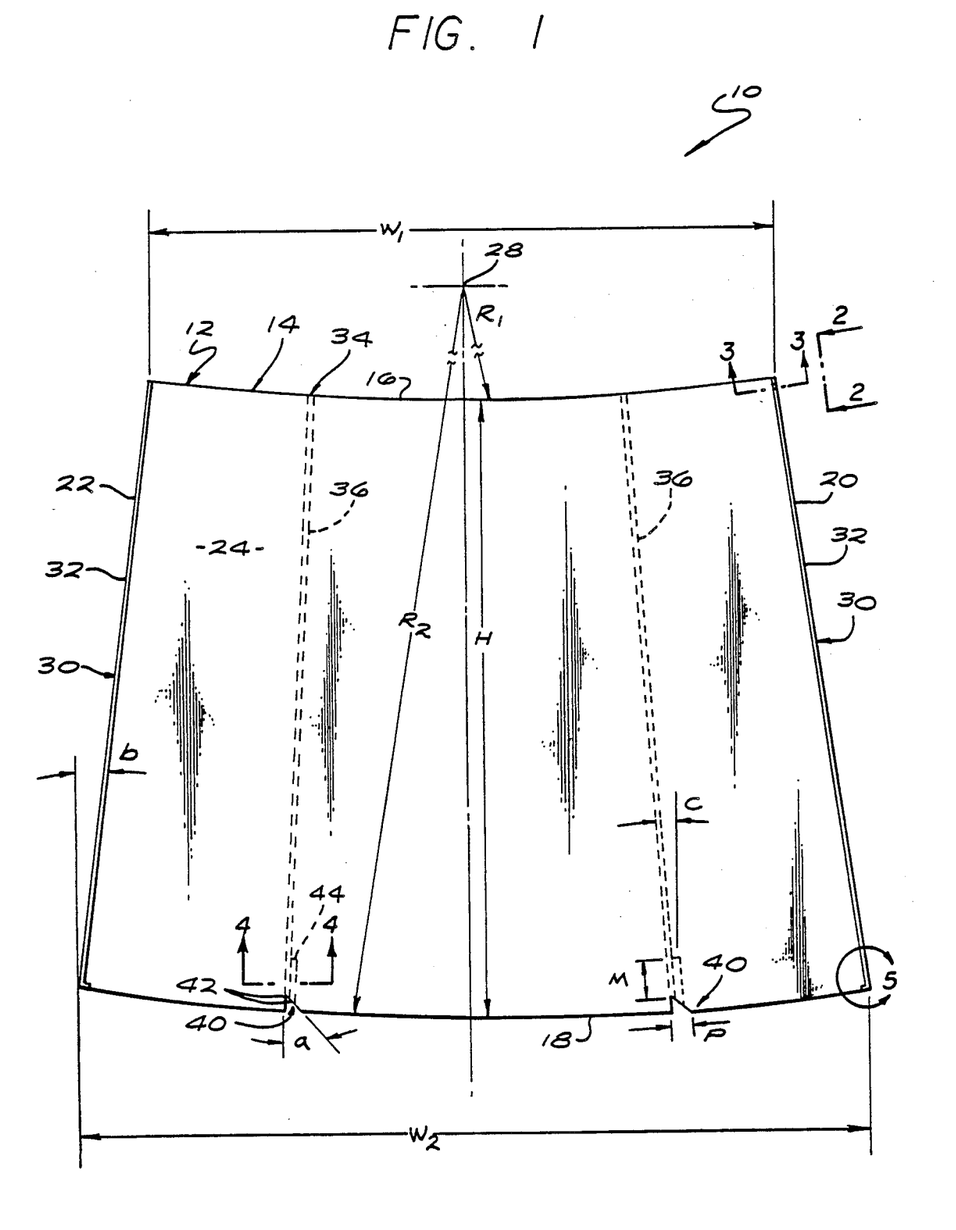
FIG. 1 illustrates a plan view of a panel useful in the practice of the present invention.

Referring now to the drawing, there is illustrated in FIG. 1 an embodiment, generally designated 10, of a panel 12 useful in the practice of the present invention. The panel 12 is generally comprised of a thin, flexible body means, generally designated 14, having an upper arcuate edge 16, a lower arcuate edge 18 spaced from the upper arcuate edge 16, a first lateral edge 20 and a second lateral edge 22 spaced from the first lateral edge 20. The first and second lateral edges 20 and 22, respectively extend between the upper arcuate edge 16 and lower arcuate edge 18. The body means 14 has an outer surface 24 and an inner surface 26 (not shown on FIG. 1).

In preferred embodiments of the present invention the upper arcuate edge 16 and lower arcuate edge 18 are arc segments of circles about a center 28 remote from the upper arcuate edge 16 and lower arcuate edge 18. The radius of curvature of the upper arcuate edge 16 is indicated in FIG. 1 by R-1 and the radius of curvature of the lower arcuate edge 18 is indicated by R-2.

According to the principles of the present invention a plurality of panels 12 may be joined together by connecting adjacent lateral edges 20 and 22 thereof. When so joined together such panels provide a generally frusto-conical shape. In order to provide a single panel that can be utilized in a variety of different sized frusto-conical shaped combined root deflectors and watering collars, the dimensions set forth for preferred embodiments of the present invention have been found to provide such combined root deflectors and watering collars when assembled in units of three, four and five such panels. It will be appreciated, of course, that such assemblies will not be perfect frusto-conical shapes since for any given diameter of a frusto-conical shape only one flat pattern will define such a frusto-conical shape. However, since precision of frusto-conical shape is not necessary in the environment in which the present invention is utilized, the deviations from true frusto-conical shape provided by the present invention are unimportant. Consequently, while the shape of the combined root deflector and watering collar described herein is "frusto-conical", it will be appreciated that this is a generalized statement and does not necessarily define a perfect frusto-conical shape. Further, for the dimensions set forth herein for the preferred embodiments of the present inventions, it has been found that frusto-conical shape combined root deflector and watering collars can provide assemblies of three having an upper diameter of approximately 17 inches, and lower diameter of about 22 inches, when assembled in units of 4 having an upper diameter of approximately 23 inches and a lower diameter of about 29 inches, and when assembled in units of 5 of such panels having an upper diameter of approximately 29 inches and a lower diameter of about 36 inches. It will be appreciated, of course, that the above set forth dimensions for the assembled units are approximate. The height of each structure is probably on the order of 18 inches.

In order to connect a plurality of panels 12 together, joining means, generally designated 30, are provided on the first lateral edge 20 and second lateral edge 22. As shown most clearly in FIG. 3, the joining means 30 generally comprises an edge rib means 32 having a first portion 32 extending from the inner surface 26 of the body means 14 and a second portion 32" extending from the outer surface 24 of the body means 14. The edge rib means 32 defines a generally "T"-shaped section with the body means 14. The edge rib means 32 on first lateral edge 20 is substantially identical to the edge rib mean 32 on second lateral edge 22 of body means 14. Edge rib means 32 on adjacent panels 14 may be joined together by a connector means as described below in greater detail.

Figures 4, 5, 6:
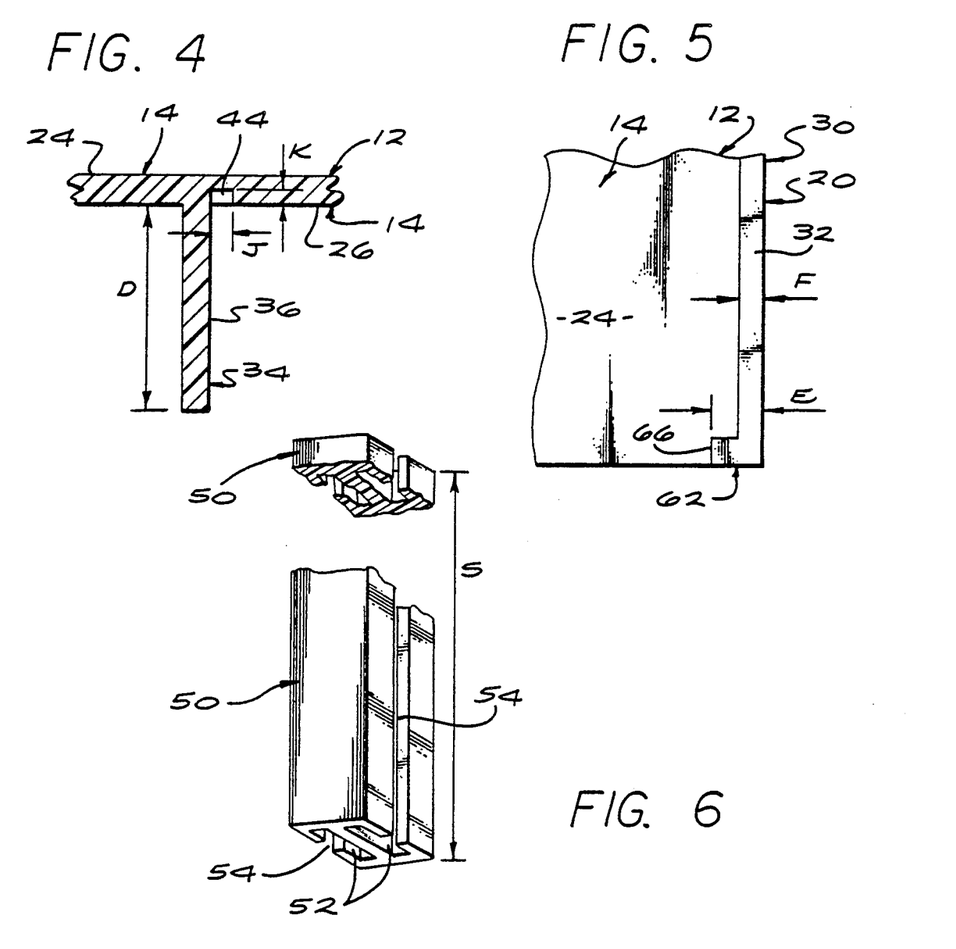
FIG. 4 is a sectional view along the section 1 line 4—4 of FIG. 1.
FIG. 5 is an enlarged view of the portion of the panel illustrated in FIG. 1 at "5"
FIG. 6 is a partial perspective view of a connector means useful in the practice of the present invention.

Interior rib means generally designated 34 and, in the embodiment 10 shown on FIG. 1 comprising two interior ribs 36 project from the inner surface 26 of the body means 14 as shown in FIG. 4 and extend generally from regions adjacent the lower arcuate edge 18 to the upper arcuate edge 16. In preferred embodiments of the present invention both the lateral edges 20 and 22 as well as the interior ribs 36 are radial from the center 28.

One of the functions of a frusto-conical root deflector and watering collar fabricated from a plurality of panels 12 is to deflect the roots of a growing tree, shrub or the like so that such roots do not cause damage to adjacent sidewalks, curbs, foundations, gutters, streets or other pavement-like structures. Since roots of such trees, shrubs or the like grow outwardly and downwardly, that is, they do not grow upwardly, prevention of damage to adjacent pavement or masonry like structures from a growing tree or shrub can be provided by deflecting the roots to grow downwardly to regions set well below the level of such adjacent pavement, streets, curbs, masonry or the like before more outwardly growth thereof is allowed. As noted above, while it may appear in certain instances that roots from a shrub or tree or the like has grown upwardly, in general, such appearance has been caused by one or both of the following factors:

(a) the thickening with time of a root that originally grew outwardly of a shallow angle and/or tree close to the ground surface; and/or (b) the erosion of the ground thereby exposing more of the root.

Therefore, directing the roots so they do not start growing significantly outwardly until they are below a predetermined level, for example is 18 inches or so, and preventing such roots from growing near the surface is desired. When the conditions described above, that is, a root that started growing near the surface becomes larger with time, it can cause the uptilting of pavements, curbs, masonry, gutters, streets or the like. Applications of the principles of the present invention to a multi-panel root deflector and watering collar can prevent such problems.

An important aspect of the present invention is that the root barrier and water collar of the frusto-conical shape which is utilized to surround the roots of a shrub or tree or the like be so designed that it does not "strangle" the roots and thereby cause damage or death to the tree, shrub or the like. In order to achieve this, the roots must be able to grow in diameter with time. Since the ribs 36 will, in general, deflect the roots so they grow downwardly, the roots must exit from below the lower arcuate edge 18 to continue their generally and outwardly and downwardly growth. Therefore, it is necessary that the panel 12 provide some structure for allowing for the increase in the diameter of the root. To achieve this result and to insure the appropriate tearing of the panel 12 there is provided on the panel 12 body means weakening means generally designated 40 adjacent each of the interior ribs 36 in regions adjacent the lower arcuate edge 18. The body means weakening means 40 is generally comprised of first walls generally designated 42 defining a notch extending from the lower arcuate edge 18 towards the upper arcuate edge 16 and second walls 44 defining a depression extending from the notch defined by the first walls 42 towards the upper arcuate edge 16 adjacent the ribs 36.

As roots are deflected along interior ribs 36 towards the lower arcuate edge 18 as they reach the notch defined by the first walls 42 such ribs will continue to grow outwardly and downwardly there through. Consequently, a root will be in the notch defined by the first walls 42 and as such root grows in diameter it will eventually cause a tear in body means 14 along the rib 36. Tearing along the interior rib 36 is facilitated by the body means weakening means depression defined by the second walls 44. Consequently, eventually as the roots grows thicker, the body means 14 will be gradually torn alongside the interior ribs 36 from the lower arcuate edge 18 downwardly toward upper arcuate edge 16. This prevents strangulation of the roots and allows for healthy tree or shrub growth.

As noted above, the preferred embodiment of the present invention allows for fabrication of frusto-conical shaped combined root barrier and water collar structures. The flexible nature of the body means 14 allows the assembly of, for example, three, four or five such panels 12 to provide various sized combined root deflectors and water collars. In order to interconnect the panels 12 there is provided a connector means illustrated generally on FIG. 6. The connector means generally illustrated at 50 has walls 52 defining edge rib accepting slots 54. The elongated length S of the connector means 50 is on the order of the length of the edge rib 32, though, preferably, it is slightly shorter. For example, in the preferred embodiment 10 of the present invention where the height H of the panel 12 is on the order of 18 inches, the length S of the connector means 50 may be on the order of 17 ½ inches.

In order to connect adjacent panels 12, the panels are placed adjacent to each other so that edge ribs 32 on adjacent panels are contiguous. A connector means 50 is then positioned above the adjacent panels 12 so that the slots 54 therein are aligned with the edge ribs 32 of the adjacent panels. The connector 50 is then slid down the edge ribs 32 from the upper arcuate edge 16 towards the lower arcuate edge 18.

Figures 2, 3:
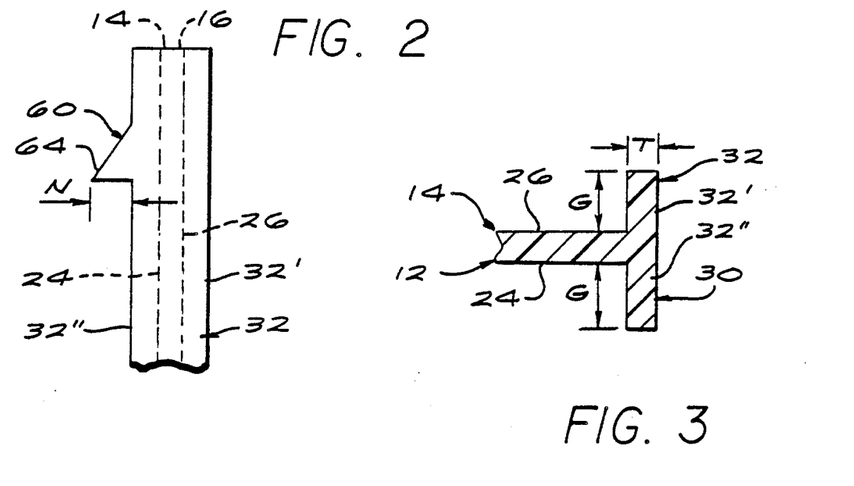
FIG. 2 is a view along the line 2—2 of FIG. 1.
FIG. 3 is a sectional view along the sectional line 3—3 of FIG. 1.

In order to retain the connector means 50 on the assembled panels 12, in preferred embodiments of the present invention there is provided an upper stop means generally designated 60 as shown in FIG. 2 and a lower stop means generally designated 62 as shown in FIG. 5. The upper stop means 60 is generally comprised of a tab means 64 extending from the outer portion 32" of edge rib 32 and, consequently, from the outer surface 24 of the panel 12. The flexibility of the connector means 50 allows the connector means 50 to be distorted as it is slid past the tab means 64 as the edge rib 32 slides in the slot 52 of the connector means 50. Once the connector means 50 has slid past the tab means 64 the resiliency of the connector means 50 allows the connector means 50 to return to its undistorted configuration. The lower stop means 62 shown in FIG. 5 generally comprises a shoulder means 66 on the outer surface 24 of the panel 12 and extending along the lower arcuate edge 18 from each edge rib 32. As the connector means 50 slides down the edge rib means 32 the bottom surface thereof engages the shoulder means 66. Preferably the shoulder means 66 extends outwardly from the outer surface 24 of the panel 12 approximately the same distance as the edge rib means portion 32 prime. The rib means 64 and/or the shoulder means 66 may, if desired, be on the inner surface 26 of body means 14.

FIGS. 1, 2, 3, 4, 5 and 6 show symbols indicating various dimensions of a preferred embodiment of the present invention. The dimensions selected are those that can provide a frusto-conical type of root deflector and watering collar which can be combined in units of 3, 4 and 5 to provide approximately a frusto-conical shape for each such combination. Table 1 below lists the dimensions for the panel 12 as indicated on FIGS. 1 through 6 to provide such a panel as may be combined as described above.

TABLE 1

(Dimensions in inches unless otherwise specified)

| | |
|---|---|
| a | 45 degrees |
| b | 7 degrees, 24 minutes |
| c | 3 degrees, 42 minutes |
| D | 0.375 |
| E | 0.120 |
| F | 0.060 |
| G | 0.060 |

TABLE 1-continued (Dimensions in inches unless otherwise specified)

| | |
|---|---|
| H | 18 |
| J | 0.060 |
| K | 0.030 |
| L-1 | 22 |
| L-2 | 29 |
| L-3 | 36 |
| M | 1.0 |
| N | 0.40 |
| P | 0.50 |
| R-1 | 70 |
| R-2 | 88 |
| S | 17½ |
| T | 0.060 |
| W-1 | 18 |
| W-2 | 23 |
| Y-1 | 17 |
| Y-2 | 23 |
| Y-3 | 29 |

With panels fabricated having the dimensions as shown above in Table 1, it has been found that such panels can be assembled into sizes that approximate the comparatively standard sizes of a 5 gallon, 15 gallon or 24" ball and 24 inch "box" or 32" balled tree.

Figures 7, 8, 9:
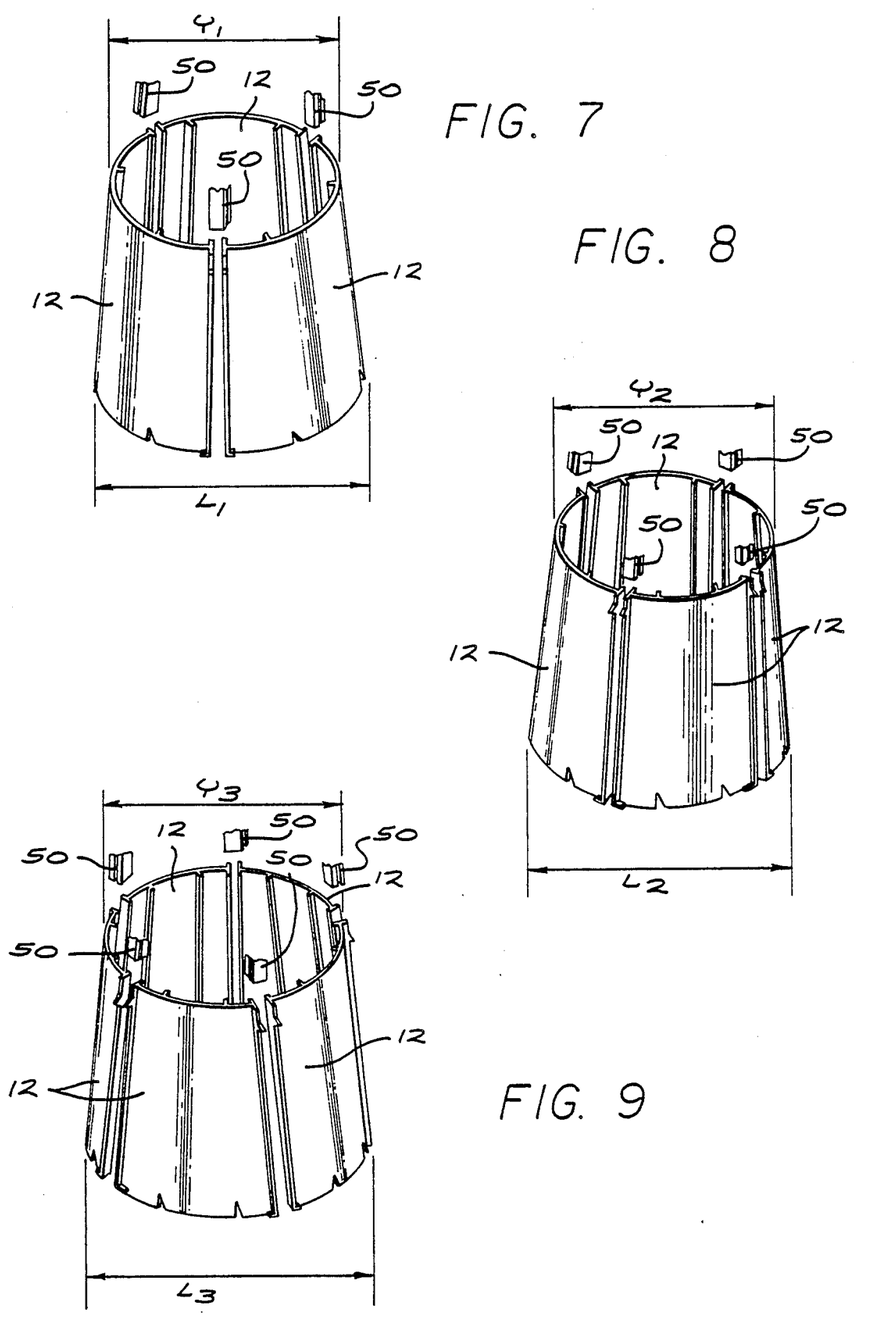
FIG. 7 is a perspective view of an embodiment of the present invention in which 3 panels of the type shown in FIG. 1 are joined together.
FIG. 8 is a perspective view of another embodiment of the present invention wherein four panels of the type shown in FIG. 1 are joined together.
FIG. 9 is a perspective view of another embodiment of the present invention wherein five panels of the type shown in FIG. 1 are joined together.

FIGS. 7, 8 and 9 illustrate arrangements of panels 12 to achieve the above described standard sizes. As illustrated in FIG. 7, 3 panels 12 are assembled together with three connector means of 50 to define a frusto-conical root deflector and watering collar of approximately the 5-gallon size.

FIG. 8 illustrates the assembly of 4 panels 12 connected together by 4 connector means 50 to define approximately 15-gallon or 24 inch balled frusto-conical root deflector and watering collar.

FIG. 9 illustrates the assembly of 5 panels 12 connected by 5 connector means 50 to define a frusto-conical root deflector and watering collar approximating the 24 inch "box" or 32 inch balled size.

As can be seen, the frusto-conical root deflectors and watering collars defined by assemblies of various numbers of the panels 12 as illustrated in FIGS. 7, 8 and 9 have their smaller diameter defined by the interconnected upper arcuated edges 16 and the larger diameter defined by the interconnected lower arcuate edges 18.

The dimensions shown in table 1 above and the interconnections of 3, 4 and 5 panels 12 as illustrated in FIGS. 7, 8 and 9 are for a preferred embodiment of the present invention and illustrate the principles of the present invention. However, it will be appreciated, that other dimensions may be utilized to provide panels which may be assembled to define other sizes of frusto-conical root deflectors and watering collars. All such variations are, of course, within the scope of the principles of the present invention.

As noted above, the frusto-conical root barriers and watering collars according to the principles of the present invention are not precise frusto-conical shapes such as would be defined by a particular "flat pattern" for each of the different sizes desired. However, deviations from a true frusto-conical shape for each different size has not shown to be any detriment to successful utilization of the root deflectors and watering collars according to the principles of the present invention as illustrated in FIG. 7, 8 and 9.

It has been found that an appropriate material for fabrication of both the panels 12 and the connector means 50 is a polypropolene copolymer in which the body means 14 is approximately 0.060 inches thick.

Table 2 below illustrates the properties of such a panel when fabricated of polypropolene copolymer having a 0.060 inches thickness.

TABLE 2

Properties of Body Means 14 Fabricated from Polypropolene Copolymer 0.060 inches thick

| PROPERTIES | ASTM TEST METHOD | VALUE POLYPROPOLENE COPOLYMER |
| --- | --- | --- |
| Tensile Stress @ Yield | D638 | 4100 to 4300 PSI |
| Elongation @ Break | D638 | 40% |
| Tensile Modulus of Elasticity | D638 | 1500 PSI |
| Flexural Stiffness Cantilever Beam | D747 | 125,000 PSI |
| Tensile Impact | D1822 | 50 Ft. Lbs/in 2 |
| Environmental Stress Crack Resistance | D16933 | 1 hr. |
| Hardness, Shore D | D2240 | 68 |

Further, it has been found that when the connector means 50 is fabricated in accordance with the dimensions shown in Table 1 it has sufficient flexibility and resiliency to both be installed on adjacent panels 12 for connecting the adjacent panels 12 together as described above as follows the necessary stiffness to insure that there is no inadvertent separation between adjacent panels 12 such that would destroy the effectiveness of the frusto-conical root deflector and watering collar of the present invention.

Figure 10:
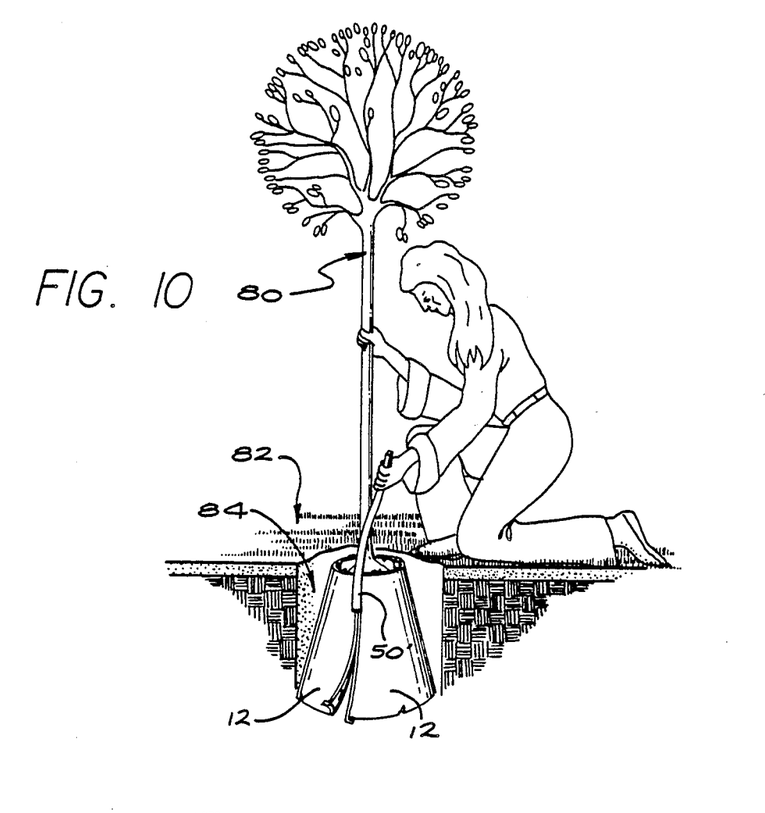
FIG. 10 illustrates installation of a combined root deflector and watering collar according to the principles of the present invention.

FIG. 10 illustrates the installation of a frusto-conical root deflector and watering collar according to the principles of the present invention for the planting of a tree 80 in the ground 82. As can be seen from FIG. 10, an appropriately sized hole 84 has been dug in the ground in accordance with well-understood principles of planting, and, in this application, the tree 80 was inserted into the hole and a 4-panel unit such as that illustrated in FIG. 8 is placed around the root wall of the tree 80 and the final connector means 50' is slid onto adjacent edge rib means to complete the frusto-conical root deflector and watering collar. It will be appreciated, however, that, alternatively, the frusto-conical root deflector and watering collar may be completely assembled before insertion in the ground.

Figure 11:
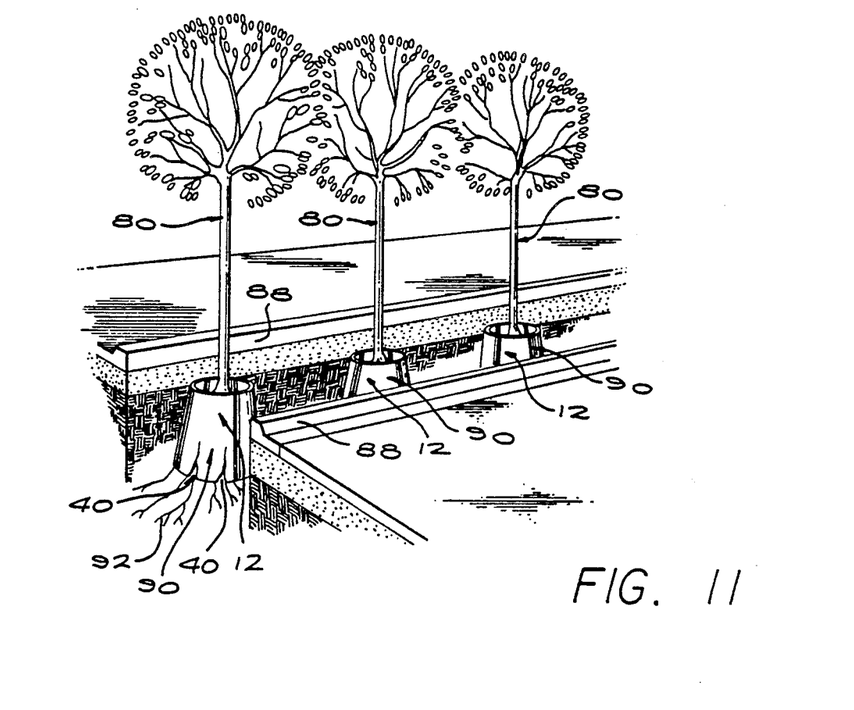
FIG. 11 illustrates the installation of three adjacent combined root deflectors and watering collars according to the principles of the present invention.

As illustrated in FIG. 11 where plurality of trees 80 are planted, the root deflector and watering collars generally designated at 90 according to the principles of the present invention have been installed so that the roots 92 are deflected downwardly by the root deflector and watering collars 90 before they are allowed to grow outwardly therefrom. Since the interior rib means on the panels 12 forming the root deflectors 90 which are, in general, similar to the 4-panel arrangements shown in FIGS. 8 and 10, the roots then grow out of the notches adjacent to the each of the interior ribs. Therefore, as the roots growing there through enlarge with time, tearing of the panels 12 adjacent to the interior ribs occurs. The combined root barrier and watering collar thus provides the desired effect of maintaining the level of roots from the trees 80 sufficiently below the curbs 88, preferably 18 inches, so such curbs are not damaged by the growing roots. The panel 12, further, has frangible characteristics such that they will tear appropriately along the interior rib means and thus not strangle or otherwise hinder the growth of the trees 80.

The applications of the present invention illustrated in FIGS. 10 and 11 show the utility thereof as a watering collar as well as a root deflector. That is, when watering the trees 80, the water may be directed onto the ground immediately adjacent the trees so and the assembled panels 12 direct the water to the growing root area. Each action minimizes water waste and provides a healthier tree 80.

This concludes the description of the preferred embodiments of the present invention. As can be seen, there has been provided a panel having certain dimensions which allow such a panel to be interconnected together in various numbers of such panels to provide various sized frusto-conical combined root deflectors and watering collars. The sizes may be the conventional sizes utilized in the industry associated with the planting of various shrubs and trees. Such root deflector and watering collar of the present invention not only directs the growing of the root downwardly so as to maintain the roots at a level below that which might cause damage to adjacent gutters, curbs, sidewalks, masonry, foundations, roads or the like, but also have sufficient frangible characteristics that such panels will tear as root diameter growth occurs with time and thus not strangle the tree or shrub with which it may be utilized.

The following claims are intended to cover all variations and adaptations of the present invention falling within the true scope of spirit thereof.

What is claimed is:

1. A panel for a multiple panel combined planter and watering collar, said panel comprising, in combination:
   a thin, flexible body means having an upper arcuate edge, a lower arcuate edge spaced from said upper arcuate edge, a first lateral edge, a second lateral edge spaced from said first lateral edge, an inner surface and an outer surface;
   interior rib means on said inner surface of said body means and projecting therefrom and said interior rib means intermediate said first lateral edge and said second lateral edge of said body means;
   body means weakening means adjacent said interior rib means at said lower arcuate edge for providing an initial location for tearing said body means for the condition of a root exerting body means tearing force at said body weakening means; and
   joining means on said first and said second lateral edges.

2. The arrangements defined in claim 1 wherein:
   said interior rib means extend radially from said inner surface.

3. The arrangements defined in claim 2 wherein:
   said joining means comprises edge rib means on said first and said second lateral edges and having a first portion projecting from said inner surface of said body means and a second portion projecting from said outer surface of said body means to define a substantially "T"-shaped section therewith; and
   said edge rib means extend radially from said inner surface.

4. The arrangements defined in claim 3 wherein:
   said body means weakening means further comprises:
      first walls defining notch means in said body means at said lower arcuate edge and extending upwardly a preselected distance towards said upper arcuate edge;
      second walls defining a depressions means extending a preselected distance adjacent said interior rib means from said notch means towards said upper arcuate surface;
   said lower arcuate edge is concentric about a remote center with said upper arcuate edge.

5. A combined root deflector and watering collar comprising a plurality of joined-together adjacent panels, and each of said panels comprising, in combination:
- a thin, flexible body means having an upper arcuate edge, a lower arcuate edge, spaced from said upper arcuate edge, a first lateral edge, a second lateral edge spaced from said first lateral edge, an inner surface and an outer surface;
- and said lower arcuate edge concentric with said upper arcuate edge about a predetermined center spaced a preselected distance from said upper arcuate edge and said lower arcuate edge;
- interior rib means on said inner surface of said body means and projecting therefrom;
- body means weakening means adjacent said interior rib means at said lower arcuate edge comprising first walls and second walls;
- joining means on said first and said second lateral edges;
- connector means for engaging said joining means on adjacent panels for connecting a plurality of panels together in a frusto-conical configuration.

6. The arrangement defined in claim 5 wherein:
said interior rib means extend radially from said inner surface;
said interior rib means further comprises:
a first and a second interior rib;
said first walls define a first and a second notch; and
said second walls define a first and a second depression.

7. The arrangement defined in claim 6 wherein:
said joining means further comprises:
- edge rib means on each of said first and said second lateral edges of said body means, and said edge rib means projects from said outer surface and from said inner surface of said body means to define a substantially "T"-shaped section therewith;
said connector means further comprises:
- an elongated strip means having walls defining a pair of edge rib accepting slots for engaging said edge rib means of adjacent panels for removably coupling adjacent panels together;
said joining means further comprises:
- upper stop means on said edge rib means and adjacent said upper arcuate edge for limiting movement of said elongated strip means towards such upper arcuate edge;
- lower stop means adjacent said lower arcuate edge for restricting movement of said elongated strip means towards said lower arcuate edge;
- wherein said lower stop means comprises a shoulder means on said body means extending along said lower arcuate edge in regions adjacent said edge rib means;
- said upper stop means comprises a tab means on said edge means and projecting therefrom in regions adjacent said upper arcuate edge;
- and wherein said shoulder means is on said outer surface of said body means, and said tab means projects outwardly from said outer surface of said body means;
- said connector means has a length less than the spacing between said upper arcuate edge and said lower arcuate edge; and
said edge rib means of each of said first and second lateral edges extend radially on said body means from said center.

8. The arrangement defined in claim 7 wherein:
said interior rib means extend approximately ⅜ of an inch from said inner surface of said body means;
said body means is on the order of 0.060 inches thick;
said depression defined by said second walls is on the order of 0.030 inches deep from said inner surface of said body means, and said preselected distance of extent along said rib means thereof is on the order of 1.0 inches;
said notch defined by said first walls further comprises a cutout portion defining a triangular cutout section and extending on the order of ½ inch from said lower arcuate edge;
said lower arcuate edge is spaced on an order of 18 inches from said upper arcuate edge;
said center is on the order of 70 inches from said upper arcuate edge;
said first predetermined arcuate length is on the order of 18 inches;
said second arcuate length is on the order of 23 inches;
said first and said second lateral edges define an included angle on the order of 14 degrees, 48 minutes;
said first and said second interior ribs are substantially equally spaced from said first and said second lateral edges and define an included an angle on the order of 7 degrees, 24 minutes.

9. A combined root deflector and watering collar comprising, in combination:
a plurality of flexible panels, each of said panels comprising:
- an upper arcuate edge defining a first predetermined arcuate length about a preselected center, said center spaced a remote distance from said upper arcuate edge;
- a lower arcuate edge spaced from said upper arcuate edge defining a second predetermined arcuate length about said center, and substantially concentric with said upper arcuate edge;
- a first lateral edge extending from said upper arcuate edge to said lower arcuate edge;
- a second lateral edge spaced from said first lateral edge and extending from said upper arcuate edge to said lower arcuate edge and defining a predetermined included angle with said first lateral edge;
- a thin, flexible body means extending between said upper arcuate edge and said lower arcuate edge and between said first lateral edge and said second lateral edge, and said body means having an outer surface and an inner surface, and a predetermined thickness between said outer surface and said inner surface;
- interior rib means on said body means and projecting from said inner surface of said body means and extending from regions adjacent said lower arcuate edge towards said upper arcuate ledge surface;
- body means weakening means comprising:
  - first walls defining notch means in said body means at said lower arcuate edge and adjacent said interior rib means and extending upwardly a preselected distance towards said upper arcuate edge; and
  - second walls defining a depression in said body means extending a preselected distance along said rib means;

joining means on said first and said second lateral edges; and connector means for engaging said joining means on adjacent panels for connecting said plurality of panels together.

10. The arrangement defined in claim 1 wherein:

said interior rib means extend radially from said center; and said first and said second lateral edges extend radially from said center.

11. The arrangement defined in claim 10 wherein:

said interior rib means comprises a first and a second interior rib;

said first walls define a first and a second notch; and said second walls define first and second depressions.

12. The arrangement defined in claim 1 wherein:

said joining means further comprises:

edge rib means on each of said first and said second lateral edges of each of said panels, and said edge rib means projects from said outer surface and projects from said inner surface of said body means to define a substantially "T"-shaped section therewith;

said connector means further comprises:

an elongated strip means having walls defining a pair of edge rib accepting slots for engaging said edge rib means of adjacent panels.

13. The arrangement defined in claim 12 wherein:

said joining means further comprises:

upper stop means on said edge rib means and adjacent said upper arcuate edge for limiting movement of said elongated strip means towards said upper arcuate edge;

lower stop means adjacent said lower arcuate edge for restricting movement of said elongated strip means towards said lower arcuate edge.

14. The arrangement defined in claim 13 wherein:

said interior rib means extend radially from said center;

said first and said second lateral edges extending radially from said center;

said interior rib means comprises a first and a second interior rib;

said first walls define a first and a second notch;

said second walls define first and second depressions;

wherein said lower stop means comprises a shoulder means on said body means extending along said lower arcuate edge in regions adjacent said edge rib means.

15. The arrangement defined in claim 13 wherein:

said upper stop means comprises a tab means on said edge rib means and extending therefrom in regions adjacent said upper arcuate edge.

16. The arrangement defined in claim 15 wherein:

said interior rib means extend radially from said center;

said first and said second lateral edges extending radially from said center;

said first walls define a first and a second notch;

said second walls define first and second depressions;

said interior rib means comprises a first and a second interior rib;

said lower stop means comprises a shoulder means on said body means extending along said lower arcuate edge in regions adjacent said edge rib means; and wherein said shoulder means is on said outer surface of said body means; and said tab means extends outwardly from said outer surface of said body means.

17. The arrangement defined in claim 16 wherein:

said connector means has a length less than the spacing between said upper arcuate edge and said lower arcuate edge.

18. The arrangement defined in claim 17 wherein:

said edge rib means of each of said first and second lateral edges project substantially the same distance from said inner and said outer surfaces.

19. The arrangement defined in claim 18 wherein:

said interior rib means extend approximately ⅜ of an inch from said inner surface of said body means;

said body means is on the order of 0.060 inches thick;

said depression defined by said second walls is on the order of 0.030 inches deep from said inner surface of said body means, and said preselected distance of extent along said rib means thereof is on the order of 1.0 inches;

said notch defined by said first walls further comprises a cutout portion defining a triangular cutout section and extending on the order of ½ inch from said lower arcuate edge;

said lower arcuate edge is spaced on an order of 18 inches from said upper arcuate edge;

said center is on the order of 70 inches from said upper arcuate edge;

said first predetermined arcuate length is on the order of 18 inches;

said second predetermined arcuate length is on the order of 23 inches;

said first and said second lateral edges define an included angle on the order of 14 degrees, 48 minutes;

said first and said second ribs are substantially equally spaced from said first and said second lateral edges and define an included angle on the order of 7 degrees, 24 minutes.

20. The arrangement defined in claim 19 wherein:

the number of panels in said plurality of panels is 3.

21. The arrangement defined in claim 19 wherein:

the number of panels in said plurality of panels is 4.

22. The arrangement defined in claim 19 wherein:

the number of panels in said plurality of panels is 5.

* * * * *